US012766424B1

(12) United States Patent
Kenny

(10) Patent No.: US 12,766,424 B1
(45) Date of Patent: Oct. 20, 2026

(54) SYSTEM AND METHOD FOR VIDEO GAME WAGERING USING SCREEN-CAPTURE VERIFICATION AND SMART-CONTRACT ESCROW SETTLEMENT

(71) Applicant: ArcadeBet Inc., Miami Beach, FL (US)

(72) Inventor: John M. Kenny, Dorado, PR (US)

( * ) Notice: Subject to any disclaimer, the term of this patent is extended or adjusted under 35 U.S.C. 154(b) by 0 days.

(21) Appl. No.: 19/560,054

(22) Filed: Mar. 8, 2026

(51) Int. Cl.

| | |
|---|---|
| ***A63F 13/85*** | (2014.01) |
| ***A63F 13/35*** | (2014.01) |
| ***A63F 13/792*** | (2014.01) |
| ***G06V 20/40*** | (2022.01) |
| ***G07F 17/32*** | (2006.01) |

(52) U.S. Cl.
CPC .............. *A63F 13/85* (2014.09); *A63F 13/35* (2014.09); *A63F 13/792* (2014.09); *G06V 20/40* (2022.01); *G07F 17/3288* (2013.01); *G06Q 2220/00* (2013.01)

(58) Field of Classification Search
CPC ........ A63F 13/85; A63F 13/35; A63F 13/792; G07F 17/3288
See application file for complete search history.

(56) References Cited

U.S. PATENT DOCUMENTS

| | | | | |
|---|---|---|---|---|
| 8,414,402 | B2 * | 4/2013 | LeMay | G07F 17/32 463/43 |
| 10,373,436 | B2 * | 8/2019 | Arnone | G07F 17/3244 |
| 11,482,074 | B1 * | 10/2022 | Dickson | G06Q 50/34 |
| 2002/0037767 | A1 * | 3/2002 | Ebin | G07F 17/3276 463/25 |
| 2007/0077994 | A1 * | 4/2007 | Betteridge | G07F 17/32 463/42 |
| 2007/0265092 | A1 * | 11/2007 | Betteridge | G07F 17/32 463/42 |
| 2014/0274337 | A1 * | 9/2014 | Fine | G07F 17/3244 463/25 |
| 2018/0089928 | A1 * | 3/2018 | Riggs | A63F 13/22 |
| 2018/0197172 | A1 * | 7/2018 | Coburn | H04L 9/321 |
| 2019/0026991 | A1 * | 1/2019 | Torres | G07F 17/3276 |
| 2024/0153349 | A1 * | 5/2024 | Finding | H04L 9/50 |

* cited by examiner

*Primary Examiner* — Chase E Leichliter
(74) *Attorney, Agent, or Firm* — Sam Pierce

(57) ABSTRACT

A cloud-based platform facilitates head-to-head wagering on video game matches by requiring participants to deposit wagered amounts into a smart-contract escrow prior to gameplay. During gameplay, the platform captures screen-share frames from each participant device at predetermined intervals and transmits the frames to a backend processing service. A detector service applies template matching, optical character recognition (OCR), or other automated image-analysis techniques to identify predefined game-specific data within configured regions. Upon detection of relevant frames, the platform submits one or more frames and/or extracted screen-region data to a machine-learning inference service via an application programming interface (API) together with a request to determine match information. An outcome module cross-validates extracted data between participants to detect inconsistencies and classify the match result. After expiration of a dispute window, a resolver submits an on-chain settlement transaction to distribute escrowed funds in accordance with the verified outcome, thereby enabling automated outcome verification.

23 Claims, 1 Drawing Sheet

Gamer vs Gamer Wagering Game Result Verification and Escrow Settlement Workflow

Gamer vs Gamer Wagering Game Result Verification and Escrow Settlement Workflow
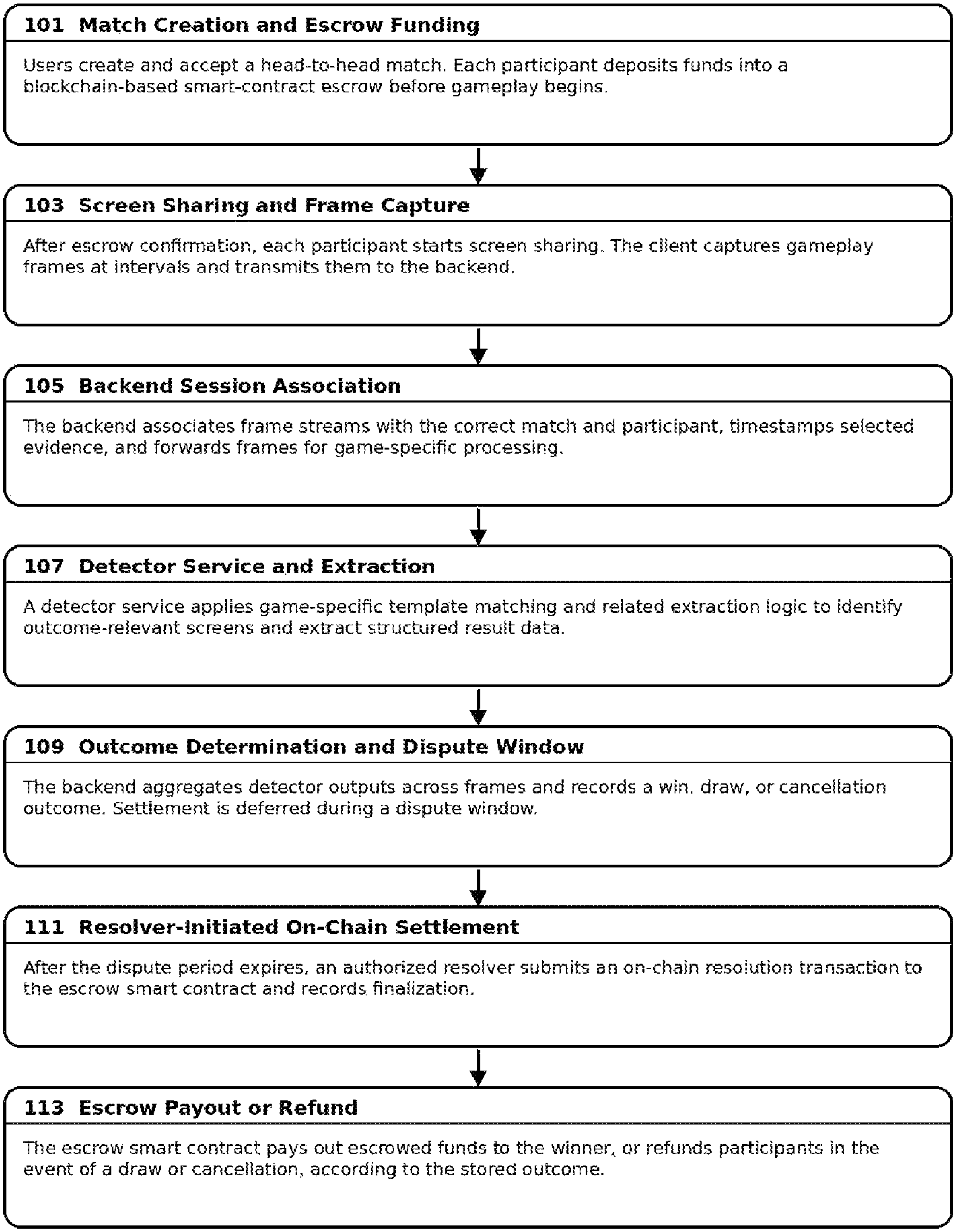

SYSTEM AND METHOD FOR VIDEO GAME WAGERING USING SCREEN-CAPTURE VERIFICATION AND SMART-CONTRACT ESCROW SETTLEMENT

BACKGROUND OF THE INVENTION

Field of Invention

The present invention relates generally to computer-implemented wagering systems and interactive gaming technologies, and more particularly to a cloud-based, non-downloadable software platform that facilitates video game wagering between participants. The invention further relates to systems and methods for capturing gameplay screen data, analyzing performance outcomes using various technologies such as template matching, optical character recognition, artificial intelligence and machine-learning techniques to resolve escrowed wagers through a blockchain-based smart-contract escrow.

BRIEF SUMMARY OF THE INVENTION

The present invention provides a computer-implemented system and method for facilitating video game wagering between participants based on the outcome of a video game session. In one embodiment, two or more users each deposit funds into a smart-contract escrow prior to initiating gameplay. During gameplay, the system captures screen data from each participant's device at defined intervals and transmits image frames to a backend processing environment. A detector service employs template matching, machine learning models, or optical character recognition to detect when relevant data is being displayed. Upon detection of relevant frames, the platform submits one or more of the captured frames and/or extracted screen-region data to a machine-learning inference service via an application programming interface together with a request to determine match information, including classification of the match result, wherein the detector service determines when such frames are relevant and triggers submission of the frames and/or extracted screen-region data. The inference service returns an outcome classification indicating, for example, which participant won, whether the match was a draw, or whether the result is indeterminate. The backend cross-validates the returned outcome against detector outputs and against the counterparty's corresponding frames prior to authorizing escrow settlement. Upon completion of the match and expiration of any dispute period, a resolver mechanism initiates on-chain settlement of the escrowed funds in accordance with the verified result. The system operates as a cloud-based platform accessible through a web interface and provides automated, transparent, and tamper-resistant wager resolution. The system further enables automated verification of gameplay outcomes in environments where direct game telemetry or publisher application programming interfaces are unavailable by performing outcome determination using screen-derived image data analyzed through computer vision and machine-learning techniques.

BRIEF DESCRIPTION OF THE FIGURES

FIG. 1 illustrates the sequential process by which a match is created and escrowed by participants (Element 101), screen-share gameplay frames are captured (Element 103) and transmitted for processing (Element 105), template matching techniques are used to target specific areas on the screen for specific predetermined data and detection of this data indicates when relevant frames occur (Element 107), once the detector service identifies one or more frames as outcome-relevant, the identified frames and/or extracted screen-region data are submitted to a machine-learning inference service via an application programming interface together with a request to classify the match result as a win, draw, or cancellation outcome (Element 109), a scheduled resolver submits an on-chain resolution transaction after a dispute window (Element 111), and the escrow contract distributes funds and records settlement (Element 113).

DETAILED DESCRIPTION

Section 1: System Architecture and Platform Overview

The present invention is directed to a computer-implemented, cloud-based wagering platform configured to facilitate video game matches between video game players that place wagers on their own gameplay. Participants match and agree to terms, then deposit funds into an escrow smart contract prior to gameplay. The system operates as a non-downloadable software accessible through a web interface and is architected as a distributed, service-oriented environment comprising a client-side application layer, a backend application layer, a detector processing service, and a smart-contract escrow and settlement layer. These components operate in coordinated fashion to enable match creation, gameplay verification through screen-based analysis, outcome determination, and automated on-chain settlement.

In one embodiment, the client-side application comprises a browser-accessible web interface implemented using a reactive front-end framework. The client application enables users to register accounts, connect digital wallets, create or accept match invitations, approve token transfers, deposit wager amounts into escrow, and initiate screen sharing during gameplay. The client application is further configured to capture image frames from a user-authorized screen sharing session at predefined intervals, including but not limited to approximately one frame per second, and to preprocess such frames through resizing and compression prior to transmission. The processed frames are securely transmitted to the backend layer using real-time transport protocols.

The backend application layer comprises one or more application servers executing match management logic, payment processing workflows, participant tracking, notification services, and outcome orchestration. The backend is configured to create match objects containing required parameters including game identifier, wager amount, and match creator, and may include optional parameters such as game type or bet type identifiers subject to validation rules. The backend further manages invitation workflows, including sending invitations to identified users or email addresses, tracking invitation status, and registering participant acceptance upon successful escrow funding. Payment transactions are recorded with associated metadata including transaction hash, payer address, network identifier, and confirmation status. The backend maintains a persistent data store for matches, participants, payments, gameplay metadata, and system audit logs.

A detector service operates as a distinct processing component, in communication with the backend, and is configured to analyze gameplay frames received during active matches. In one embodiment, the detector service is implemented as an API-based microservice that processes incoming images using game-specific detection configurations. Each supported video game is associated with predefined regions of interest and staged detection rules corresponding to screens that include data used to settle the transactions such as game states or score displays. The detector service applies a variety of methods, including template matching and machine-learning techniques, to extract textual and numerical information from designated screen regions, and evaluates the extracted data against expected game-state transitions. The detector service returns structured results to the backend, including a relevance indication and optionally extracted data fields produced by template matching and, when needed, optical character recognition, and responsive to the relevance indication the backend transmits selected frames and/or extracted screen-region data to the machine-learning inference service with a request to determine match information.

The blockchain layer comprises at least one deployed smart contract configured to function as an escrow mechanism. Participants deposit a predetermined wager amount, denominated in a supported digital token, into the escrow contract prior to gameplay initiation. The smart contract maintains custody of the deposited funds until a resolution function is invoked. In one embodiment, resolution authority is restricted to a designated resolver address controlled by the backend system. Upon receipt of a verified outcome from the backend following detector analysis and expiration of any defined dispute window, the resolver address submits a transaction to the escrow contract to release escrowed funds in accordance with the determined result, including win, draw, or cancellation states.

The overall architecture is configured to ensure separation of responsibilities among the client interface, backend orchestration layer, detector analysis service, AI layer and smart-contract escrow. Communication between components is conducted using encrypted protocols, and each transaction or state transition within a match lifecycle is recorded within the backend. The system may be deployed within a scalable cloud infrastructure supporting containerized services, horizontal scaling, and load-balanced traffic distribution and automated provisioning of multiple instances to accommodate concurrent matches and high-volume user participation.

Through the coordinated interaction of these components, the invention provides a technically integrated platform enabling automated, screen-verified, video game player versus player wagering on video game performance with escrowed smart-contract settlement, while maintaining operational scalability, security, and transparency.

Section 2: Match Configuration, Invitation Workflow, and Escrow Funding Lifecycle In the present invention, a wagered match is instantiated through a structured creation and acceptance workflow that binds wagering terms, counterparties, and escrow funding requirements into a unified match record. A match is created when a registered user, via the web-based client interface, submits required parameters including at least a game identifier and a bet amount to be wagered. In certain embodiments, optional parameters may also be provided, including a game type identifier and a bet type identifier. Where optional parameters are used, the backend enforces validation rules ensuring that the selected bet type is permitted for the identified game and, if applicable, that the bet type is compatible with the selected game type. The match creator is designated as the owner of the match record for purposes of management and cancellation rights prior to counterparty funding and match activation.

Upon creation, the backend application generates a match object and persists it within a database as an authoritative off-chain representation of the wager event. The match object includes identifiers for the selected game and any game subtype, the bet amount, a match status, timestamps, and a creator reference. In embodiments supporting game-specific requirements, the system further associates participant-specific metadata with the match, including a platform username or other identifier required to interpret gameplay screens reliably for the applicable title. The match is initially assigned a pending state and is not eligible to proceed to gameplay verification until both required counterparties have joined and funded the escrow contract associated with the match.

The invention supports an invitation mechanism through which the match creator proposes the match to one or more counterparties. Invitations may be directed to an existing user account by user identifier or to a prospective participant that is not yet onboarded to the system. Each invitation is stored with a status indicator, including pending, accepted, or rejected, and the backend is configured to issue notifications reflecting invitation state changes. In a preferred embodiment, acceptance is not merely a user-interface acknowledgment but is coupled to the completion of the escrow funding obligation. Accordingly, in some implementations an invitee's successful payment into escrow automatically causes the invitation to be marked accepted and causes a participant record to be created or updated for that invitee within the match.

Escrow funding is enforced as a prerequisite to match activation. Each participant deposits a specified bet amount into a smart-contract escrow on a blockchain network using a supported digital token. The client application facilitates escrow funding by initiating, when required, an approval transaction authorizing transfer of the token amount, followed by a deposit transaction to the escrow contract. The backend monitors deposit activity and generates a corresponding payment record that includes a transaction hash, amount, token or network identifiers, payment status, and a payer wallet address associated with the on-chain transaction. The backend then confirms payment, updates the participant record to reflect funded status, and transitions the match state as counterparties complete their deposits.

The invention further provides state transition controls that prevent commencement of gameplay verification until escrow deposits are confirmed for the required participants. In a typical player versus player embodiment, the match transitions from pending to funded only when both counterparties have deposited into the escrow. If the match remains unfunded due to nonpayment by an invited participant within a defined time window, the system permits cancellation by the match creator and initiates a return of any deposited funds as applicable. In certain embodiments, where only one party has deposited and no counterparty has funded, the system causes the escrow to refund the depositing party and records such cancellation in the match ledger. The backend maintains a comprehensive audit trail of match creation, invitations, participant status changes, payment confirmations, cancellations, and refunds, thereby supporting compliance review and enabling later verification of match integrity.

By structuring match objects with validated wager terms, enforcing invitation state with participant funding status, and requiring on-chain escrow deposits as a gating condition for match activation, the system ensures that each wagered match is fully collateralized and traceable prior to gameplay. This architecture reduces counterparty risk, limits opportunities for payment disputes, and provides a reliable operational foundation for downstream screen-based gameplay verification and automated settlement.

Section 3: Screen Capture Acquisition, Frame Streaming, and Detector-Based Outcome Determination Following match activation through escrow funding as described in Section 2, the system transitions the match into an active gameplay verification state in which each participating user provides screen-based gameplay evidence for automated analysis. In one embodiment, the client application initiates a user-authorized screen sharing session and captures image frames from the shared display at defined time intervals, including approximately every 1000 milliseconds. The client application may preprocess each captured frame by resizing, compressing, and normalizing the image to reduce bandwidth consumption while preserving sufficient visual fidelity for downstream detection. The client then transmits the frames to the backend over an encrypted real-time communication channel, thereby enabling near-real-time verification without requiring direct integration with a game publisher API. This architecture permits outcome verification across multiple video game titles without requiring integration with game publisher telemetry systems or proprietary application programming interfaces.

The backend application layer maintains a match session context for each active participant and associates incoming frames with the corresponding match identifier and participant identifier. In certain embodiments, the backend establishes persistent socket connections for each participant to support low-latency delivery and ordering of frames. The backend further timestamps received frames, optionally de-duplicates substantially identical frames, and stores selected frames or derived metadata in a persistent repository to support later dispute resolution, audit requirements, or detector retraining. The backend may also enforce minimum participation requirements, such as requiring that screen sharing remain active during defined match windows and that a sufficient number of frames be received to enable reliable determination of match completion and outcome.

The invention employs a detector service configured to analyze gameplay frames using game-specific detection logic. In one embodiment, the detector service operates as a separate API-based process that receives frames from the backend and returns structured detections. The detector service is configured with per-game detection profiles that define stages, regions of interest, and expected screen layouts. A stage may correspond to a particular screen state, such as a scoreboard view, end-of-match results screen, ranking panel, or other user interface element known to display player identifying or outcome-determinative data. The regions of interest define bounding areas within a frame from which textual or numeric indicators are expected to be extracted. This staged approach enables the detector service to reduce false detections by applying the appropriate extraction logic only when the frame is consistent with the expected screen state.

When template matching or machine-learning models return a low confidence score for analyzed images, the system will rely on supplemental extraction methods such as optical character recognition, applied within the detector service, to extract alphanumeric values from the defined regions. In some embodiments, the OCR process includes binarization, contrast enhancement, noise removal, and scaling operations to increase recognition accuracy for game-specific fonts and overlay styles. The OCR results are assembled into structured fields, including but not limited to final score values, win/loss indicators, placement, eliminations, or other metrics dependent on the selected game and bet type. The detector service may additionally apply pattern matching or computer vision classifiers to identify non-textual visual cues, such as team logos, victory banners, defeat icons, or other UI artifacts that corroborate an extracted outcome.

The detector service returns to the backend a relevance determination for one or more frames and optionally extracted data fields and confidence values associated with the analyzed frame set. In certain embodiments, the detector service compares gameplay indicators extracted from frames captured from multiple participants in order to confirm that the detected match outcome is mutually consistent between participants. Responsive to the relevance determination, the backend transmits selected frames and/or extracted screen-region data to the machine-learning inference service to obtain match information, including an outcome classification, which is then evaluated in view of detector outputs and the counterparty's corresponding evidence. In preferred embodiments, the backend does not rely on a single frame to determine the outcome, but instead performs cross-checking across multiple frames and across multiple detection stages to confirm consistency. For example, the backend may require repeated detection of the same winner indicator across multiple time-adjacent frames and may reconcile a scoreline from template matching or OCR against a separately detected win banner. In preferred embodiments, the system cross-checks the counterparty's screen and confirms that the corresponding result is consistent prior to determining the winner. Where the extracted data is contradictory, incomplete, or outside expected ranges, the backend may mark the match state as indeterminate or disputed, thereby preventing immediate settlement until further validation occurs. In certain embodiments, the system may solicit additional evidence, trigger reprocessing of stored frames, or permit manual escalation under administrative review procedures.

For head-to-head wagering embodiments, the backend associates each participant with an outcome attribute, such as win, loss, draw, or unknown, based on detector outputs. Where all participants' result attributes are consistent and mutually coherent, such as one participant marked win and the other participant marked loss, the backend records a resolved result. Where both participants are marked draw, a draw result is recorded. Where both participants lack sufficient data or are marked unknown, or where required gameplay evidence is missing due to interruption of screen sharing, the backend may record a cancellation condition. These outcome states are persisted as part of the match record and are used in downstream settlement logic.

By implementing periodic frame capture, secure streaming, stage-based detection profiles, template matching, OCR extraction from defined screen regions, and multi-frame cross-checking for contradiction avoidance, the system provides a technical mechanism for verifying gameplay outcomes using screen-derived evidence. This approach enables automated and scalable match outcome determination in environments where direct game telemetry access is unavailable or unreliable, and establishes the verified result data set that is subsequently used for escrow resolution and payout processing as described in Section 4.

Section 4: Blockchain Escrow Contract, Resolver Authority, and Deferred On-Chain Settlement In the present invention, wagered funds are secured and distributed using a smart-contract escrow that holds participant deposits and releases value only upon an authorized resolution event. In a preferred embodiment, the escrow contract is deployed as a programmable contract configured to accept deposits denominated in a supported digital token, including but not limited to an ERC-20 compatible token, and to associate such deposits with a match identifier generated by the platform. Each match instance corresponds to a distinct escrow context in which at least two counterparties deposit substantially equal bet amounts prior to gameplay. The escrow contract maintains custody of the deposited funds during the match lifecycle and prevents unilateral withdrawal except under defined cancellation or refund conditions encoded within the contract logic.

In one embodiment, the escrow contract includes functions to (i) register or create a match entry, (ii) accept deposits from participants for that match entry, and (iii) execute a resolution procedure that finalizes the escrow and distributes funds based on a verified outcome. The contract may record state variables representing deposit status per participant, total escrowed amount, and a resolution status flag indicating whether the match is unresolved, resolved, refunded, or canceled. The contract further supports multiple terminal outcomes, including at least a win condition, a draw condition, and a cancellation condition, each of which produces a different distribution behavior. For a win condition, the contract transfers escrowed value to a designated winning address; for a draw condition, the contract refunds each participant's deposited amount; and for a cancellation condition, the contract returns deposits according to defined rules that may account for whether both parties funded or only a subset of parties funded.

To minimize fraud and preserve deterministic settlement behavior, the escrow contract restricts the authority to finalize a match to a resolver address that is authorized within the contract. In such embodiments, the resolver address is controlled by the platform operator through a secure signing mechanism and is permitted to submit on-chain transactions invoking the contract's resolution function. The resolver submits, as transaction inputs, at least the match identifier and an encoded outcome value. The contract validates that the match identifier exists, that the escrow has not already been finalized, and that the caller is the authorized resolver address before executing distribution of escrowed funds. This authorization model prevents arbitrary third parties from attempting to resolve a match and ensures that settlement corresponds to outcomes determined by the platform's verification pipeline.

The platform performs outcome determination off-chain using the screen-based capture and detector analysis described in Section 3, and stores the resulting participant outcomes in an authoritative match record. In a preferred embodiment, on-chain settlement is performed after a defined delay period, thereby allowing time for dispute initiation, correction of incomplete evidence, or resolution of contradictory detector outputs. The backend system implements a deferred settlement procedure that may be triggered on a scheduled basis, including by a cron-like scheduling process that periodically identifies matches eligible for finalization. Eligibility conditions may include completion status, expiration of a dispute window, confirmation that required participant deposits are present, and confirmation that the match has not previously been settled.

When the scheduled settlement process identifies an eligible match, the backend derives the match outcome from the stored participant result attributes. In one embodiment, a win outcome is derived when one participant is recorded as a winner and the other participant is recorded as a loser; a draw outcome is derived when both participants are recorded as draw; and a cancellation outcome is derived when outcome data is missing, contradictory, or insufficient for a reliable determination, including where screen capture was interrupted or where required end-of-match screens were not detected. Prior to submitting an on-chain resolution transaction, the backend locks or marks the match record to prevent concurrent settlement attempts. The backend then uses the resolver signing mechanism to submit the resolution transaction to the escrow contract and records the resulting transaction hash upon confirmation.

The system further defines payout address selection rules to ensure that escrowed funds are delivered to a correct recipient address. In one embodiment, the platform associates each deposit with a payer address observed on-chain during the escrow deposit transaction. Where a payer address is available and valid, the payout address for that participant is preferentially derived from the payer address to ensure direct settlement to the funding wallet. For draw and cancellation outcomes resulting in refunds, the contract may refund to the recorded depositor addresses or to the addresses provided during deposit execution, thereby ensuring that funds are returned to the original funding wallets.

To protect the resolver authority and reduce the risk of unauthorized settlement, the resolver signing environment may be isolated within a secure execution context. In certain embodiments, the resolver signing key is stored in encrypted form, including within an encrypted wallet file, and access to the decryption credential is restricted to the backend runtime environment under controlled operational policies. The platform may further implement access controls, key rotation procedures, and transaction monitoring to detect anomalous resolution activity.

By employing a blockchain escrow contract with restricted resolver authority, supporting explicit win, draw, and cancellation outcomes, and implementing deferred scheduled settlement after a dispute window, the system provides a transparent and tamper-resistant mechanism for distributing wagered funds in accordance with verified gameplay outcomes. This architecture enables automated settlement while preserving operational safeguards against contradictory evidence, settlement race conditions, and unauthorized contract execution.

Section 5: User Interface, Data Storage, Dispute Handling, and Operational Safeguards In the present invention, the platform provides a web-based user interface and supporting backend workflows to manage match visibility, user notifications, evidence retention, dispute handling, and system safeguards that maintain integrity across the wagering lifecycle. The client application presents match status information to each participant, including invitation state, escrow funding confirmation, screen sharing readiness, active verification state, and post-match outcome status. The interface further provides prompts and controls for wallet connection, token approval, escrow deposit execution, and activation of screen sharing. Notifications may be delivered through in-platform messaging, electronic mail, or other messaging channels to indicate critical events, including invitation delivery, counterparty acceptance, deposit confirmation, match start eligibility, result availability, and settlement completion.

The backend stores match records, participant records, payment records, and verification outputs in a persistent data repository. Match records may include identifiers for the selected game, any game type or bet type configuration, bet amounts, timestamps, and state indicators reflecting lifecycle progression from creation through settlement. Participant records may include the participant identifier, associated wallet address, platform username where required, invitation status, funding status, and outcome fields produced by the verification pipeline. Payment records may store transaction hashes, payer addresses observed on-chain, token identifiers, network identifiers, status fields reflecting confirmation and finalization, and linkage to the associated match and participant. In preferred embodiments, the backend stores additional audit log entries capturing state transitions and critical actions, thereby enabling reconstruction of match history for compliance review and operational debugging.

The system further supports evidence retention and selective storage of gameplay-derived data. During active matches, frames captured and streamed from participant devices may be processed in real time and may also be buffered or stored, in whole or in part, to support subsequent reprocessing. In some embodiments, the system stores only a subset of frames, such as frames associated with detected end-of-match screens or frames exceeding a confidence threshold. In other embodiments, the system stores derived metadata, including template matching results, OCR output strings, bounding region identifiers, timestamps, confidence scores, and detector stage identifiers, without permanently storing raw image content. Storage policies may be configured to balance evidentiary needs against privacy constraints and storage cost, while maintaining sufficient data to support disputes, audits, and model improvement.

A dispute handling workflow is provided to address instances in which a participant challenges the outcome determination. In one embodiment, a dispute window is defined following match completion, during which settlement is deferred as described in Section 4. During the dispute window, a participant may submit a dispute request through the user interface, optionally including supplemental evidence or contextual information. Upon dispute submission, the backend may mark the match as disputed and inhibit inclusion in scheduled settlement processing until the dispute is resolved. Resolution may include reprocessing stored frames through the detector service, applying updated detection configurations, performing additional cross-checking of extracted data, or escalating the match for administrative review. If dispute resolution results in a modified outcome, the backend updates the stored match outcome fields prior to settlement. If the dispute cannot be resolved due to insufficient or contradictory evidence, the backend may designate the match as canceled, thereby causing refund logic to be applied during escrow resolution.

The platform enforces operational safeguards to prevent manipulation of the verification process. In one embodiment, the client application and backend cooperate to ensure that frames are associated with the correct match and participant and are delivered with continuity sufficient to infer that gameplay proceeded without interruption. The backend may monitor for indicators of tampering, including repeated identical frames, irregular frame cadence, overlay artifacts inconsistent with expected gameplay screens, or abrupt termination of screen sharing prior to end-of-match screens. Such indicators may trigger enhanced scrutiny, additional evidence requests, or automatic cancellation depending on configured rules.

The platform additionally supports scalability and reliability through deployment on cloud infrastructure configured for horizontal scaling, redundancy, and monitoring. The backend services may be containerized and deployed behind load balancers, with separate scaling policies for real-time frame ingestion, detector request handling, database operations, and scheduled settlement. The detector service may be scaled independently based on image processing demand, and the system may apply rate limits, back-pressure controls, and queue-based buffering to prevent overload during periods of high concurrent matches. Observability tooling may monitor key performance indicators including frame ingestion rate, detector latency, match throughput, settlement backlog, error rates, and blockchain transaction confirmation times.

Through these user interface workflows, persistent record keeping, dispute controls, evidence retention policies, and operational safeguards, the invention provides a complete end-to-end system that supports reliable head-to-head and group player vs player video game wagering with screen-verified outcomes and on-chain escrow settlement.

DETAILED DESCRIPTION OF FIGURES

FIG. 1 Element 101

The process begins when a first user creates a gamer versus gamer match through a web-based interface by selecting at least a game identifier and a bet amount, and a second user accepts the match invitation. Each participant funds the match by depositing the bet amount into a blockchain-based smart-contract escrow, optionally following a token approval transaction where required. The backend records match configuration fields and associates each participant with corresponding deposit metadata including transaction hash, payer address, token, network, and confirmation status. The match is not advanced to gameplay verification until required counterparties have completed escrow deposits and such deposits are confirmed.

FIG. 1 Element 103

After escrow funding is confirmed, each participant initiates a screen sharing session through the client interface. During gameplay, the client captures image frames of the shared gameplay display at predetermined intervals, including approximately every 1000 milliseconds, and may preprocess the frames through resizing, compression, and normalization to preserve detector readability while reducing bandwidth. The client tags frames with match and participant identifiers and transmits the frames over an encrypted communication channel to the backend.

FIG. 1 Element 105

The backend receives the transmitted frames and associates each frame stream with the correct match session and participant record. In one embodiment, the backend maintains real-time connections to support low-latency receipt and ordering of frames. The backend timestamps frames, optionally stores selected frames or derived metadata for evidentiary retention, and forwards frames to a detector service according to per-game processing rules. The backend may enforce minimum continuity requirements for frame cadence and screen sharing duration to reduce the likelihood of incomplete evidence.

FIG. 1 Element 107

A detector service processes received frames using game-specific detection configurations defining stages and regions of interest corresponding to outcome-relevant user interface screens. Template matching and/or optical character recognition is applied to the configured regions to extract textual and numeric indicators such as scores, placement, victory banners, or other end-of-match result data. The detector service outputs structured extraction results and may include confidence values and stage identifiers. The extracted results are returned to the backend for aggregation and consistency evaluation.

FIG. 1 Element 109

The backend performs outcome determination by aggregating detector outputs across multiple frames and applying cross-check logic to ensure that extracted data is possible, non-contradictory, and sufficient to satisfy wager parameters of the match configuration. Where the extracted indicators designate one participant as winner and the other as loser, the backend records a win outcome; where both participants indicate a draw state or equivalent outcome condition, the backend records a draw outcome; and where the evidence is missing, inconsistent, or insufficient, the backend records a cancellation outcome. The backend stores the outcome state within the match record and initiates a dispute window during which settlement is deferred and a participant may submit a dispute request.

FIG. 1 Element 111

After expiration of the dispute window and upon satisfaction of settlement eligibility conditions, a scheduled settlement process identifies matches that are complete and not yet finalized. The process locks the match record to prevent duplicate settlement attempts, derives the settlement outcome from the stored outcome state, and uses an authorized resolver mechanism to submit an on-chain resolution transaction to the escrow smart contract. The backend records the resulting blockchain transaction hash and updates the match record to reflect finalization status.

FIG. 1 Elément 113

Upon receipt of the resolution transaction, the escrow smart contract distributes the escrowed funds according to the designated outcome. For a win outcome, the contract transfers funds to a payout address associated with the winning participant, including in preferred embodiments a payer address observed from the deposit transaction and, when unavailable, a wallet address stored in the user profile. For a draw outcome, the contract refunds deposits to the respective participants. For a cancellation outcome, the contract refunds deposits according to encoded cancellation rules. The platform records settlement completion and provides a transaction receipt linked to the match.

What is claimed is:

1. A computer-implemented system for facilitating player versus player wagering on a video game match, the system comprising:

a. a non-downloadable, cloud-hosted software platform accessible via a web interface executing on a first user device and a second user device;

b. a match management server configured to create a match record including at least a game identifier and a bet amount, and to associate a first participant and a second participant with the match record;

c. a smart-contract escrow deployed on a blockchain ledger and configured to receive a first deposit of the bet amount from the first participant and a second deposit of the bet amount from the second participant and to hold the first deposit and the second deposit in escrow;

d. screen capturing executing on each of the first user device and the second user device and configured, during gameplay, to capture image frames of a gameplay display at predetermined intervals and transmit the image frames to the match management server;

e. a detector service configured to continuously process the image frames using template matching and selectively applied optical character recognition to detect outcome-relevant screen states and to generate a relevance indication identifying one or more frames and/or screen regions for further evaluation; and configured, responsive to the relevance indication, to submit the identified frames and/or extracted screen region data to a machine-learning inference service with a request to classify a match result and to receive an outcome classification;

f, wherein outcome determination is configured to cross-check detector outputs to confirm that the match result is non-contradictory and sufficient to satisfy wager parameters of the match record and to designate a match outcome as one of a win outcome, a draw outcome, or a cancellation outcome; and wherein settlement is configured, after a dispute window, to invoke an authorized resolver function of the smart-contract escrow to distribute the escrowed first deposit and second deposit according to the designated match outcome, wherein the match management server maintains a persistent socket connection with each user device to receive the image frames with reduced latency.

2. The system of claim 1, wherein the screen capture captures and transmits the image frames at an interval of approximately one second.

3. The system of claim 1, wherein the screen capture preprocesses the image frames by resizing or compressing the image frames prior to transmission.

4. The system of claim 1, wherein the detector service applies staged detection rules corresponding to different game screen states, including an end-of-match results screen.

5. The system of claim 1, wherein the detector service is configured with regions of interest within the image frames and applies template matching to the regions of interest to detect predefined visual indicators associated with an outcome-relevant screen state.

6. The system of claim 1, wherein the outcome determination requires repeated detection of a same outcome indicator across multiple image frames before designating the match outcome.

7. The system of claim 1, wherein the outcome determination designates the cancellation outcome when gameplay evidence is missing, contradictory, or insufficient to determine the win outcome or the draw outcome.

8. The system of claim 1, wherein the match record further includes at least one of a game type identifier or a bet type identifier, and wherein the match management server validates that the bet type identifier is permitted for the game identifier.

9. The system of claim 1, further comprising an invitation configured to transmit an invitation from the first participant to the second participant and to store an invitation status selected from pending, accepted, or rejected.

10. The system of claim 9, wherein the invitation automatically marks the invitation status as accepted upon confirmation that the second deposit has been received by the blockchain escrow smart contract.

11. The system of claim 1, further comprising a payment record configured to store, for each deposit, a transaction hash, a payer address, a token identifier, a network identifier, and a confirmation status.

12. The system of claim 1, wherein the blockchain escrow smart contract restricts settlement authority to a resolver address authorized within the smart contract.

13. The system of claim 12, wherein the settlement executes under a scheduled process that periodically identifies matches eligible for settlement and submits a resolution transaction from the resolver address.

14. The system of claim 13, wherein the scheduled process locks the match record prior to submitting the resolution transaction to prevent duplicate settlement attempts.

15. The system of claim 1, wherein, for the win outcome, the settlement designates a payout address that corresponds to a payer address associated with the winning participant deposit.

16. The system of claim 15, wherein the payout address is designated as a user-profile wallet address when the payer address is unavailable.

17. The system of claim 1, wherein, for the draw outcome, the blockchain escrow smart contract refunds the first deposit to the first participant and refunds the second deposit to the second participant.

18. The system of claim 1, wherein the match management server stores at least one of selected image frames, extracted text results, confidence values, or detector stage identifiers for dispute review.

19. The system of claim 1, wherein the system is further configured to receive a dispute request during the dispute window and to inhibit settlement until the dispute request is resolved by reprocessing stored evidence or by designating the cancellation outcome.

20. The system of claim 1, wherein the outcome determination determines the match result without reliance on a video game publisher application programming interface by analyzing screen-captured gameplay frames using computer vision or machine-learning techniques.

21. The system of claim 1, wherein the outcome determination cross-validates gameplay data extracted from image frames captured from the first user device and the second user device to confirm that the detected match result is consistent across participants.

22. The system of claim 1, wherein the detector service first applies template matching to determine whether an outcome-relevant screen state is present and, when a confidence score of the template matching falls below a defined threshold, selectively applies optical character recognition to extract textual or numerical indicators from the image frames.

23. The system of claim 1, wherein the machine-learning inference service comprises a trained image classification model configured to classify gameplay outcome states based on visual indicators extracted from the captured gameplay frames.

* * * * *